(12) United States Patent
Maierhofer et al.

(10) Patent No.: US 8,201,886 B2
(45) Date of Patent: Jun. 19, 2012

(54) LUMBAR SUPPORT

(75) Inventors: Gunter Maierhofer, Stahnsdorf (DE);
Veit Stossel, Nuremberg (DE); Klaus Junker, Diessen am Ammersee (DE);
Jan Petzel, Tubingen (DE)

(73) Assignee: Schukra Geraetebau GmbH, Berndorf (AT)

( * ) Notice: Subject to any disclaimer, the term of this patent is extended or adjusted under 35 U.S.C. 154(b) by 525 days.

(21) Appl. No.: 11/922,305

(22) PCT Filed: May 31, 2006

(86) PCT No.: PCT/EP2006/005205
§ 371 (c)(1),
(2), (4) Date: Feb. 24, 2009

(87) PCT Pub. No.: WO2006/133809
PCT Pub. Date: Dec. 21, 2006

(65) Prior Publication Data
US 2009/0212615 A1    Aug. 27, 2009

(30) Foreign Application Priority Data
Jun. 16, 2005 (DE) .................. 10 2005 027 922

(51) Int. Cl.
*A47C 7/46* (2006.01)
(52) U.S. Cl. ................ 297/284.4; 297/284.7; 297/284.1
(58) Field of Classification Search ............... 297/284.4, 297/284.7, 284.8, 284.1
See application file for complete search history.

(56) References Cited

U.S. PATENT DOCUMENTS

| | | | | |
|---|---|---|---|---|
| 3,378,299 A * | 4/1968 | Sandor | ........................ | 297/284.4 |
| 3,762,769 A * | 10/1973 | Poschl | ........................ | 297/284.4 |
| 3,938,858 A * | 2/1976 | Drabert et al. | ............. | 297/284.4 |
| 4,159,847 A * | 7/1979 | Arai | ............................. | 297/284.4 |
| 4,182,533 A * | 1/1980 | Arndt et al. | ................. | 297/284.4 |
| 4,295,681 A * | 10/1981 | Gregory | ..................... | 297/284.4 |
| 4,313,637 A * | 2/1982 | Barley | ......................... | 297/284.4 |
| 4,601,514 A * | 7/1986 | Meiller | ........................ | 297/284.4 |
| 4,810,033 A * | 3/1989 | Kemmann | ................... | 297/284.4 |
| 5,076,643 A * | 12/1991 | Colasanti et al. | ........... | 297/284.6 |
| 5,088,790 A * | 2/1992 | Wainwright et al. | ....... | 297/284.4 |
| 5,174,526 A * | 12/1992 | Kanigowski | ............... | 244/122 R |
| 5,423,593 A * | 6/1995 | Nagashima | .................. | 297/284.4 |
| 5,452,868 A * | 9/1995 | Kanigowski | ............... | 244/122 R |
| 5,462,335 A * | 10/1995 | Seyler | ......................... | 297/284.4 |
| 5,553,919 A * | 9/1996 | Dennis | ........................ | 297/284.8 |

(Continued)

FOREIGN PATENT DOCUMENTS
AU        670508 B2     7/1996
(Continued)

OTHER PUBLICATIONS
PCT International Search Report for PCT/EP2006/005205.

*Primary Examiner* — Laurie Cranmer
(74) *Attorney, Agent, or Firm* — Michael Best & Friedrich LLP

(57) ABSTRACT

Lumbar support for a seat backrest, comprising a support basket (10) extending in the longitudinal direction of the seat backrest, a frame (12) to which the support basket (10) is mounted and an adjustment device (11) which changes the position of the support basket relative to the frame, the adjustment device including a plurality of adjustment members (60) some of which are movable with respect to one another.

20 Claims, 6 Drawing Sheets

U.S. PATENT DOCUMENTS

| | | | |
|---|---|---|---|
| 5,651,583 A * | 7/1997 | Klingler et al. | 297/284.4 |
| 5,718,476 A * | 2/1998 | De Pascal et al. | 297/284.4 |
| 5,791,733 A * | 8/1998 | van Hekken et al. | 297/284.4 |
| 5,806,927 A * | 9/1998 | Schneider | 297/284.4 |
| 5,868,466 A * | 2/1999 | Massara et al. | 297/284.6 |
| 5,913,569 A * | 6/1999 | Klingler | 297/284.4 |
| 6,045,185 A * | 4/2000 | Ligon et al. | 297/284.4 |
| 6,056,360 A * | 5/2000 | Schneider | 297/284.4 |
| 6,092,871 A * | 7/2000 | Beaulieu | 297/284.4 |
| 6,227,618 B1 * | 5/2001 | Ligon et al. | 297/284.4 |
| 6,254,186 B1 * | 7/2001 | Falzon | 297/284.1 |
| 6,682,144 B2 * | 1/2004 | Klingler | 297/284.4 |
| 6,695,402 B2 * | 2/2004 | Sloan, Jr. | 297/284.4 |
| 6,779,844 B2 * | 8/2004 | Dosen et al. | 297/284.4 |
| 6,908,152 B2 * | 6/2005 | McMillen | 297/284.4 |
| 7,270,374 B2 * | 9/2007 | Moriggi | 297/284.4 |
| 7,309,105 B2 * | 12/2007 | Mundell et al. | 297/284.4 |
| 7,458,637 B2 * | 12/2008 | Norman et al. | 297/284.4 |
| 2004/0075320 A1 * | 4/2004 | Klingler | 297/284.8 |

FOREIGN PATENT DOCUMENTS

| | | |
|---|---|---|
| DE | 10213377 | 9/2002 |
| DE | 10243617 A1 | 4/2004 |
| JP | 58170638 A * | 10/1983 |
| JP | 59114135 A * | 7/1984 |
| JP | 63232046 A * | 9/1988 |
| JP | 05207920 A * | 8/1993 |
| WO | WO 9500053 A1 * | 1/1995 |
| WO | WO 99/55200 | 11/1999 |

* cited by examiner

LUMBAR SUPPORT

CROSS-REFERENCE TO RELATED APPLICATIONS

This application claims priority to PCT/EP2006/005205 filed on May 31, 2006; which claims priority to DE 102005027922.8 filed Jun. 16, 2005.

The present invention relates to a lumbar support for a seat backrest. The invention relates in particular to a lumbar support as incorporated in backrests of motor vehicle seats, office furniture seats or domestic furniture seats.

Lumbar supports of this kind are incorporated in seat backrests in order to provide adequate support in the lumbar vertebral or lordosis region of a person sitting on the seat by forming a suitable support surface. As a rule the lumbar support has a support basket fixed to a frame arranged in the seat backrest. By means of an adjustment device the curvature or convexity of the support basket can normally be adjusted, either manually or electrically. With the aid of the adjustment device the person sitting on the seat can adapt the support of the back provided by the lumbar support individually to his requirements.

Known from DE 102 13 377 A1 is a seat backrest having a lumbar support in which an adjustment device is provided for adjusting the behavior of the lumbar support regarding curvature, said adjustment device having a curved body provided with a curved actuating face and mounted swivellably about a pivot axis for acting on the lumbar support. However, the curvature of the support basket and therefore of the seat backrest can be varied only within narrow limits by such a system. Furthermore, optimal support for the lower lumbar vertebral region is not possible with such a system.

It is therefore an object of the present invention to provide a lumbar support in which the curvature can be adjusted more variably, whereby the lumbar support can be adapted more individually to different body geometries of the person seated on the seat. In addition, the lower region of the lumbar spinal column is to be ideally supported. This object is achieved according to the invention by a lumbar support according to the independent claims. Preferred embodiments of the invention are specified in the dependent claims.

According to a first embodiment the lumbar support according to the invention has a support basket extending in the longitudinal direction of the seat backrest and a frame in which the support basket is mounted. In addition, an adjustment device that changes or adjusts the position of the support basket relative to the frame is provided. According to the invention the adjustment device includes a plurality of adjustment members, some of which are arranged to be movable with respect to one another. Because of the plurality of adjustment members, some of which are movable with respect to one another and some are not movable with respect to one another, the adjustment device can influence the position of the support basket in such a way that better support of the lower back region of the person sitting on the seat is possible.

The adjustment device preferably has at least one adjustment element which includes the plurality of adjustment members. This adjustment element can have two ends, each end being connected to a pulling element, actuation of which changes the positions of the adjustment members at least partially with respect to one another.

Through actuation of the pulling element, the radius of curvature of the adjustment element is varied, the positions of the adjustment members being partially changed. In areas of the adjustment device in which the adjustment members change their position with respect to one another only slightly or not at all, the radius of curvature is large; in areas of the adjustment element in which most of the adjustment members are displaced with respect to one another the radius of curvature is small. Through actuation of the pulling element the adjustment device presses on the support basket and thereby changes its position relative to the frame.

In a preferred embodiment the pulling element is a Bowden cable, the core of the Bowden cable being mounted to one end of the adjustment element and the sleeve in which the core is guided being mounted to the other end of the adjustment element. When the core is pulled the two ends of the adjustment element are moved towards one another, whereby the curvature of the adjustment element is changed.

Upon actuation of the adjustment device, for example, by pulling the core of the Bowden cable as described above, the adjustment device presses on the support basket. The latter is preferably mounted swivellably to the frame by only one of its ends, the second end being swivellable freely in the seat backrest. The support basket is preferably mounted to the upper end of the frame, viewed from the upper end of the seat backrest, the lower end of the support basket which is to support the lumbar region of the person on the seat swivelling away in the direction of the person's back upon actuation of the adjustment device. In addition, the adjustment device may have two adjustment elements, each of which has a plurality of adjustment members, the two adjustment elements being connected to one another by their ends. If two adjustment elements, each having a plurality of adjustment members, are used, the actuation of the support basket and of its curvature can be varied more widely. Preferably, the two first ends of the two adjustment elements are connected to the core of the Bowden cable while the other two ends of the adjustment elements are connected to the sleeve of the Bowden cable. If the Bowden cable is actuated one adjustment element adopts a convex curvature and the other adjustment element a concave curvature. Through the, on the one hand, convex and, on the other hand, concave curvature of the two adjustment elements the spatial extension of the adjustment device can be greatly varied with a short pull, whereby the support basket can also be arched or swivelled more simply.

Preferably, some adjacent adjustment members of an adjustment element are arranged in a fixed manner with respect to one another while other adjacent adjustment members of the adjustment element are arranged movably with respect to one another. Through the choice of the quantity of the mutually fixed adjustment members and of the mutually movable adjustment members the curvature and therefore the actuation of the support basket can be influenced.

If two adjustment elements are provided, one of the adjustment elements is mounted to the frame in such a way that both ends of this adjustment element are freely movable. Preferably, the adjustment element mounted to the frame is mounted to the frame approximately centrally between the two ends.

In addition, the adjustment device may be arranged displaceably in the longitudinal direction of the seat backrest. For example, the adjustment element mounted to the frame may be guided longitudinally on the frame, a movement of the area of the adjustment element connected to the frame perpendicular to the latter not being possible.

According to a further preferred embodiment the adjustment element guided on the frame may be curved concavely upon actuation of the pulling element while the other adjustment element not mounted to the frame is curved convexly. If the pulling element is not actuated and the adjustment device is in its rest position, the adjustment elements are disposed substantially parallel to the frame, the support basket also being disposed substantially parallel to the frame. Upon actuation of the pulling element the two ends of the adjustment elements are moved towards one another, so that one adjustment element is curved concavely and the other convexly, and the support basket is raised from the frame at its lower end. Preferably, the lower end of the support basket is not mounted to the frame. Thus, the lower end swivels towards the front. In this way the lower end of the support basket can support the lower region of the spinal column of the person seated on the seat better than if the support basket were fixed to the frame by its lower end. The lower end of the back can therefore be better supported by the free end of the support basket.

Furthermore, the upper free end of the adjustment element or elements, viewed from the free end of the seat backrest, may be connected to the core of the Bowden cable while the lower free end of the adjustment element or elements is connected to the sleeve of the Bowden cable.

Through the selection of the movability of adjacent adjustment members with respect to one another, or by fixing adjustment members with respect to one another, the curvature of the adjustment elements and therefore of the adjustment device can be selected. In a preferred embodiment the adjustment element that is not fixed to the frame is so configured that, viewed from the free end of the seat backrest, more adjustment members are not movable with respect to one another in an upper section of the adjustment element than in a lower section of the adjustment element. Likewise, the adjustment element that is fixed to the frame may be so configured that, viewed from the free end of the seat backrest, more adjustment elements are movable with respect to one another in an upper section of the adjustment element than in a lower section of this adjustment element. Through the above embodiments the curvature of the adjustment device can be selected non-uniformly. In addition, it can be achieved thereby that the apex of curvature moves lower down when the pulling element is actuated, whereby, in addition, the lower part of the back can be supported better.

The adjustment element is preferably an undulating strip that is bordered by a rail on each of its lateral edges. The rail may have, for example, incisions and/or recesses ensuring the movability of the individual adjustment members with respect to one another. The incisions may be formed on one edge of the rail and the recesses on the other, opposed edge of the rail. If no incisions and recesses ate provided the adjustment members are not movable with respect to one another, so that this section of the adjustment element likewise cannot be curved.

The invention also relates to a lumbar support for a seat backrest that has a support basket extending in the longitudinal direction of the seat backrest. The lumbar support also has a frame to which the support basket is mounted and an adjustment device that changes the position of the support basket relative to the frame. According to one aspect of the invention the support basket is fixed swivellably to the frame by only one end, while the other end of the support basket is freely movable, and swivels away from the frame upon actuation of the adjustment device. By virtue of the fact that one end of the support basket, preferably the lower end of the support basket located in proximity to the seat base, is not fixed to the frame, the support basket can support the lower region of the back better than if the support basket were also fixed to the frame by its lower end, as is usual in the prior art. It is obvious to the person skilled in the art that, with free movement of the lower end of the support basket, account is taken of the fact that the support basket is located inside the seat backrest, so that the free movement is limited by the seat backrest cover. However, in the context of the present invention "free" means that this end is not fixed to the frame.

The invention is elucidated in more detail below with reference to the appended schematic drawings, in which.

Figure 8A:
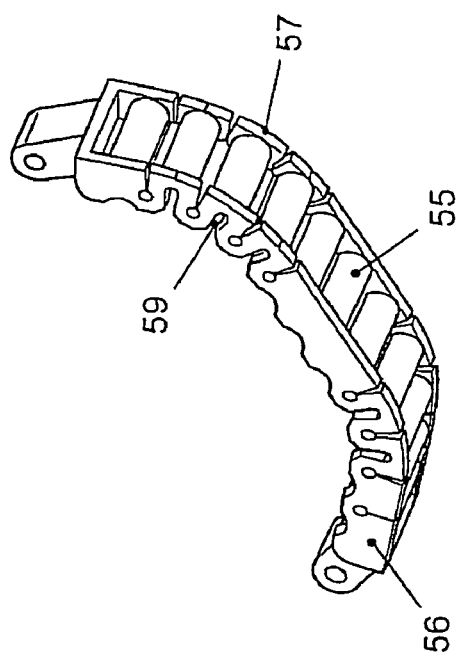
Figure 8B:
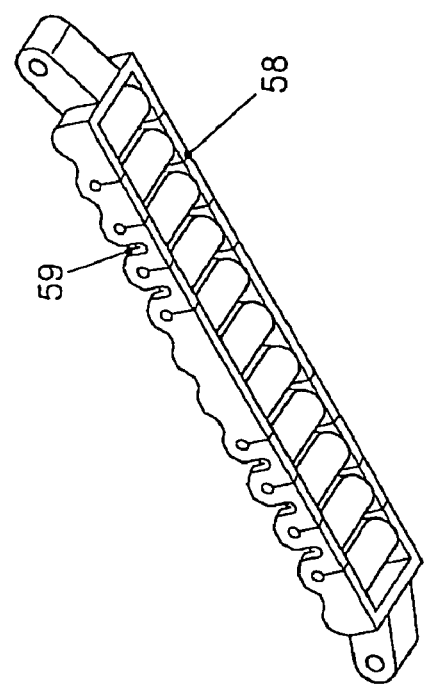
Figure 7A:
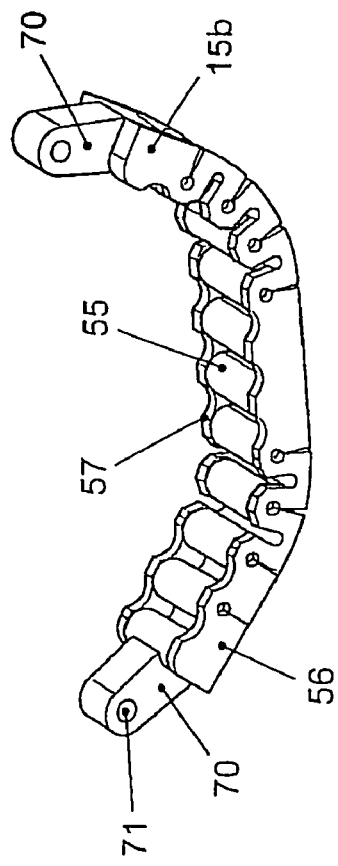
Figure 7B:
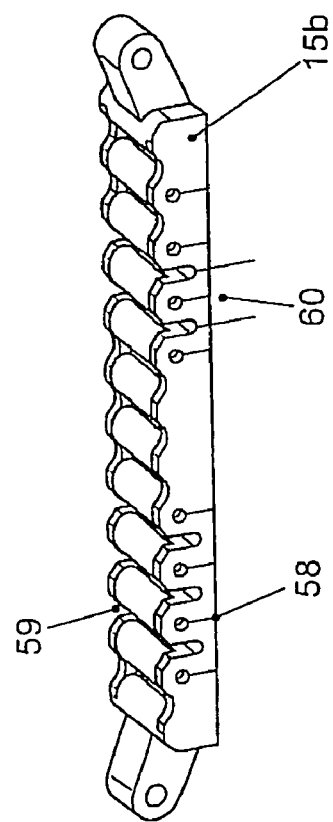
Figure 9:
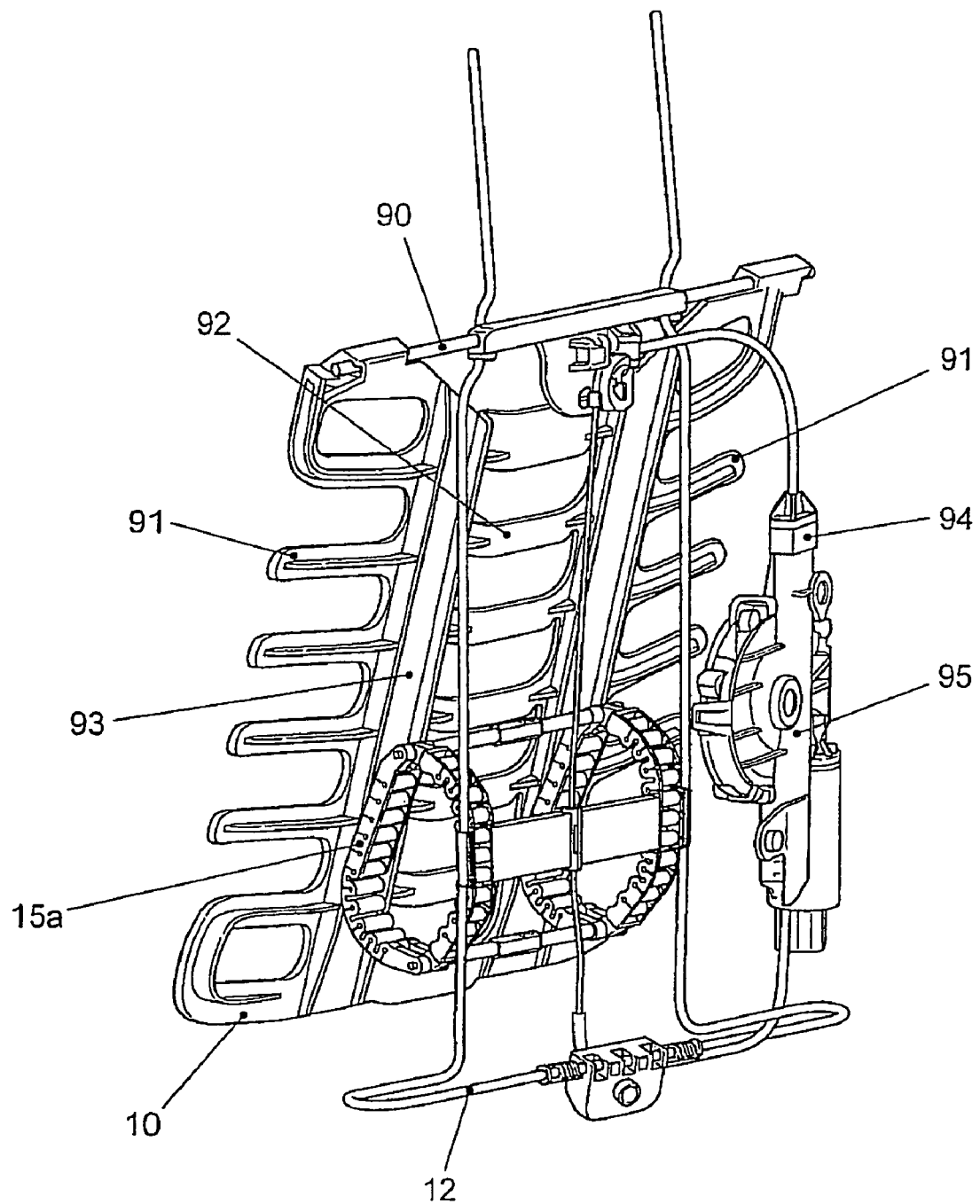
Figure 10:
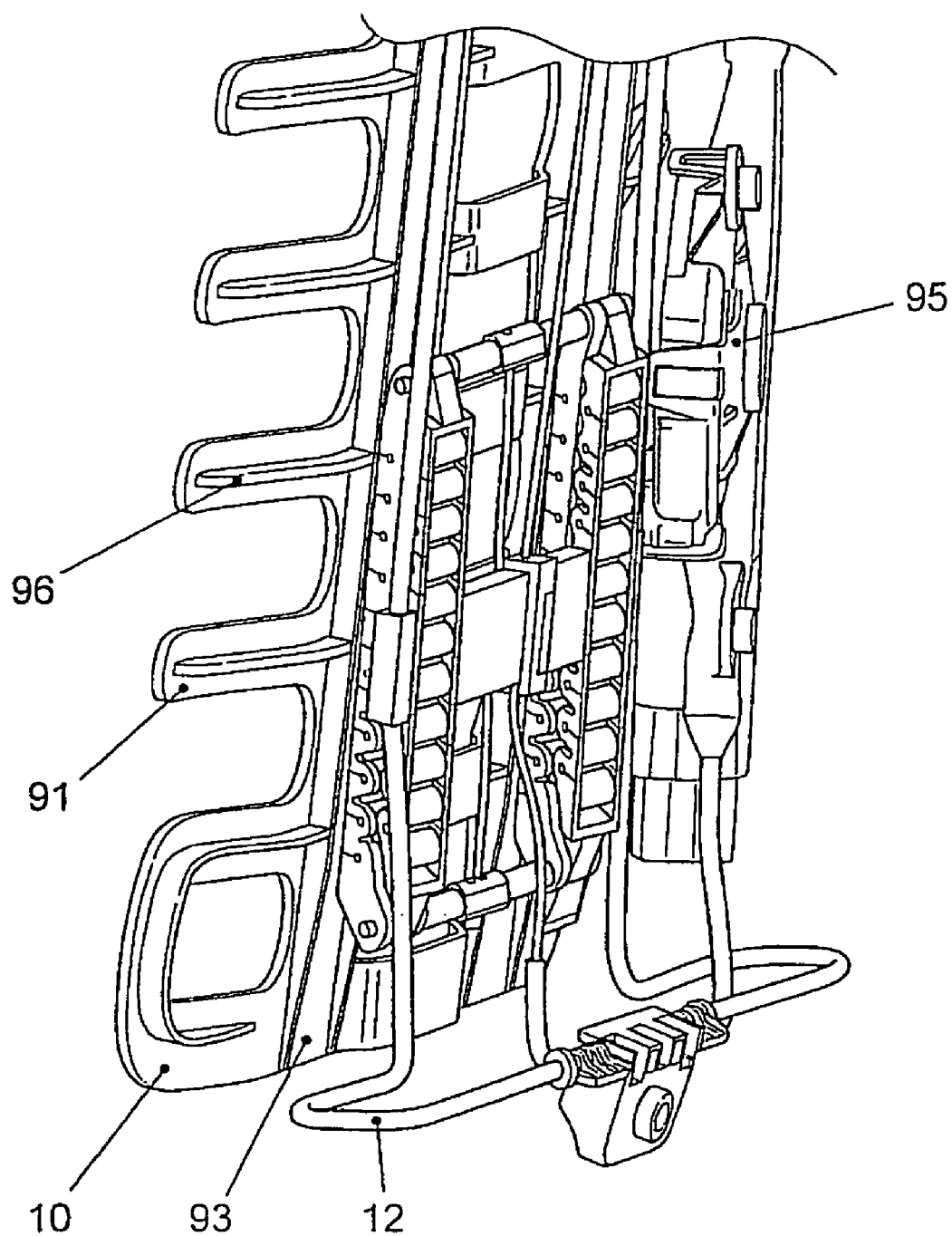

FIGS. 7*a* and 7*b* show an adjustment element of the adjustment device in the curved and non-curved state in a perspective view;

FIGS. 8*a* and 8*b* show an adjustment element in the curved and non-curved state in a perspective view;

FIG. 9 shows the whole lumbar support from the rear with the support basket deployed in a perspective view, and FIG. 10 shows the lumbar support in the non-deployed state in a perspective view.

Figure 2:
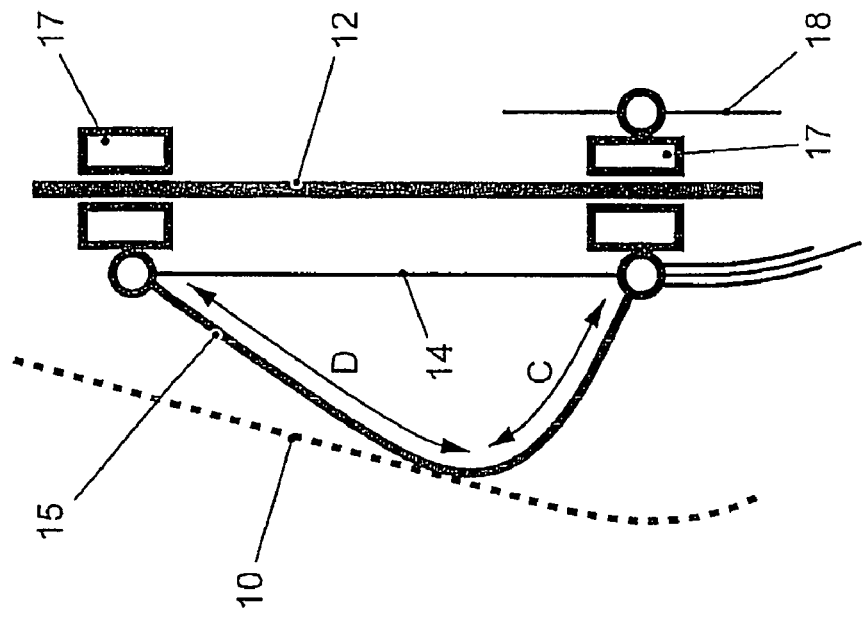
FIGS. 1 and 2 show the lumbar support according to a first embodiment in the rest position and in a curved position.
Figure 1:
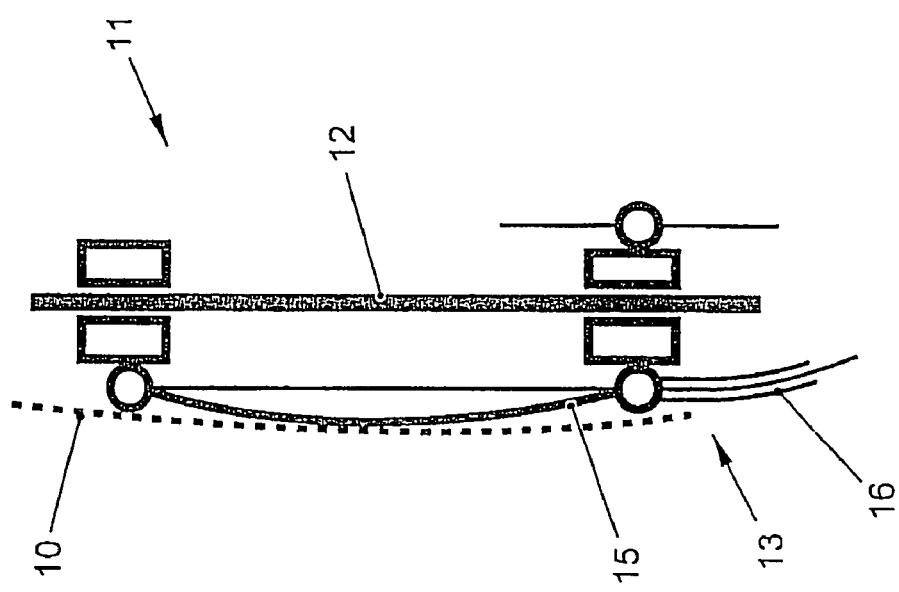

FIGS. 1 and 2 show schematically a lumbar support according to a first embodiment. The lumbar support has a support basket 10, represented by a broken line, which is incorporated in a backrest (not shown) of a seat. Also provided is an adjustment device 11 mounted to a frame 12, with which adjustment device 11 the support basket 10 can be moved. In the embodiment illustrated in FIG. 1 the support basket 10 is disposed substantially approximately parallel to the frame 12. In this position it does not form a separate support of the lower back region of the person located on the seat. The frame 12 defines the longitudinal direction of the seat backrest.

In the position illustrated in FIG. 2, the adjustment device 11 has pushed the support basket 10 towards the front. The adjustment device is actuated by a Bowden cable 13, the core 14 of the Bowden cable being fixed to the upper end of an adjustment element 15 of the adjustment device 12. The sleeve 16 in which the core 14 is guided is attached to the lower end of the adjustment element 15. When the Bowden cable 14 is pulled the upper and lower ends of the adjustment element 15 are moved towards one another, so that the adjustment element 15 is curved convexly, as shown in FIG. 2, and thus presses the support basket 10 outwardly at its lower end. In the embodiment represented in FIGS. 1 and 2 the ends of the adjustment element 15 are each guided in guides 17 on the frame 12, so that upon actuation of the core 14 they can move towards one another. Furthermore, the whole adjustment device 11 can be moved vertically along the frame 12 with a Bowden cable 18 shown schematically. Consequently, the adjustment device 11 can be curved and height-adjusted with independent mechanisms. As will be explained in more detail later in connection with FIGS. 5 to 8, the adjustment element 15 may be so configured that an upper section D is curved by a relatively small amount while a lower section C is curved by a larger amount. A lumbar region of the person located on the seat can thereby be better supported if the backrest of the seat (not shown) is formed as shown in FIGS. 1 and 2.

Figure 4:
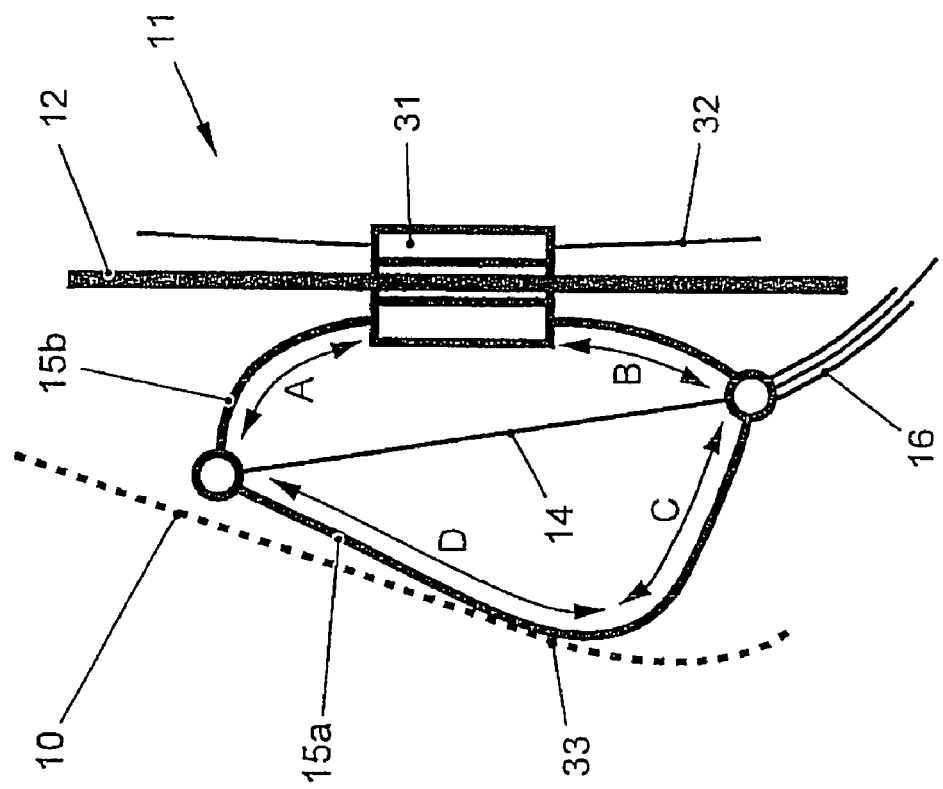
FIGS. 3 and 4 show a lumbar support according to a second preferred embodiment in the rest position and in a curved position.
Figure 3:
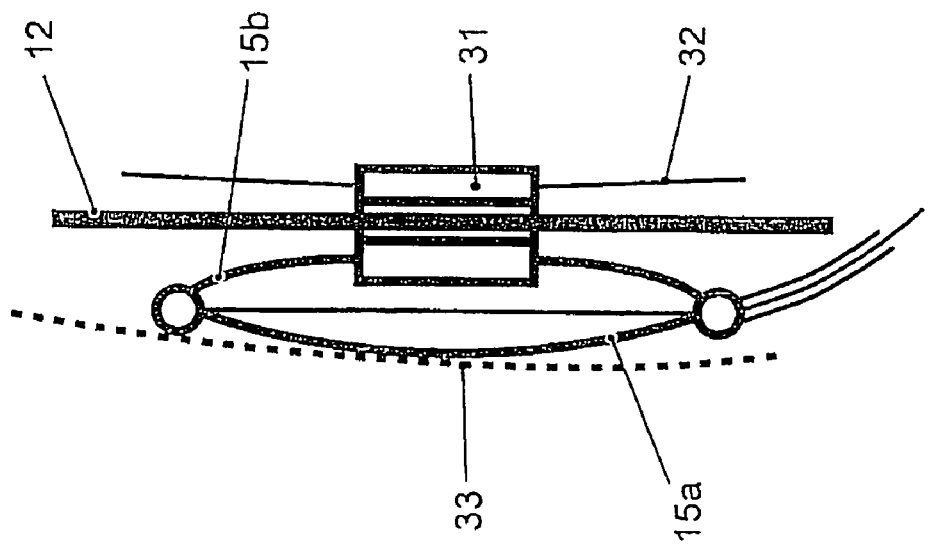

A further embodiment of a lumbar support is illustrated in FIGS. 3 and 4. In this embodiment the adjustment device 11 has two different adjustment elements 15*a* and 15*b* which are connected together by each of their ends. These ends are connected, as in FIGS. 1 and 2, to the core 14 and the sleeve 16 of the Bowden cable. In the embodiment illustrated the rear adjustment element 15*b* is mounted to the frame 12 with a guide 31. The guide 31 is height-adjustable along the frame by means of a further Bowden cable of which the core 32 is illustrated. As can be seen in FIG. 4, when the core 14 is pulled the adjustment device 11 is deformed in such a way that the adjustment element 15a is deformed convexly while the adjustment element 15b is deformed concavely. Through the deformation of the two adjustment elements 15a, 15b relatively sharp curvature of the adjustment device 11 can be achieved, whereby the support basket 10 is moved at its free end towards the back of the person sitting on the seat.

In the embodiment illustrated in FIG. 4 the adjustment element 15b is so configured that an upper section A is curved by a relatively large amount while a lower section B of the adjustment element 15b is only slightly curved. It is thereby possible by actuation of the Bowden cable to move the apex of curvature 33 further downwards and towards the front, making it possible to support the lower lumbar area of the back even more strongly. Self-evidently, sections A, B, C and D of the adjustment elements may also be so configured that they all curve uniformly, so that the apex of curvature 33 would move only towards the front and not downwards.

Figure 5:
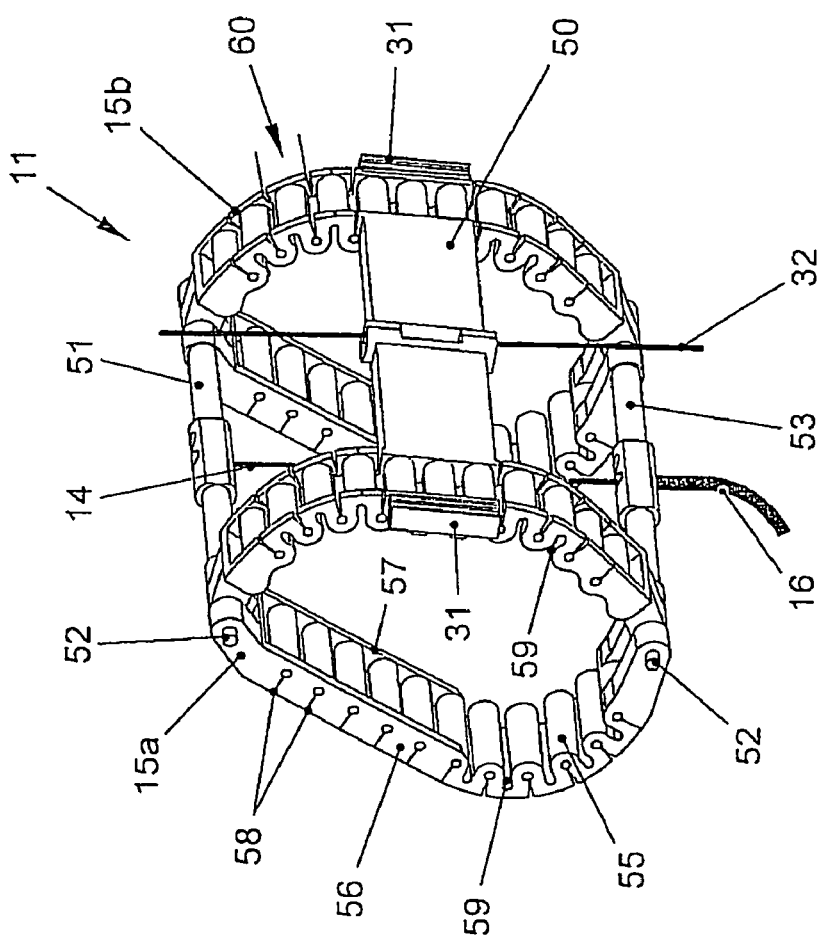
FIG. 5 shows the adjustment device of the second embodiment in a curved state.

In FIG. 5 the adjustment device 11 is shown perspectively from the rear. The adjustment device 11 is connected to the frame (not shown) by the rear adjustment element 15b via a guide plate 50 which connects the two guides 31. With the core 32 of the Bowden cable (not shown) the height of the whole adjustment device can be adjusted up or down.

It can also be seen that the two adjustment elements 15a and 15b are connected together by an upper connecting bar 51. This connecting bar 51 has a shaft 52 by which the two ends of the adjustment elements 15a, 15b are connected to one another. In addition, the Bowden cable core 14 is connected to the connecting bar.

In a similar way the two lower ends of the adjustment elements 15a, 15b are connected by a lower connecting bar 53 to the shaft 52, to which the sleeve 16 of the Bowden cable is also connected. When the Bowden cable is actuated the bar 51 is pulled towards the bar 53 so that the adjustment elements 15 are curved.

Figure 6:
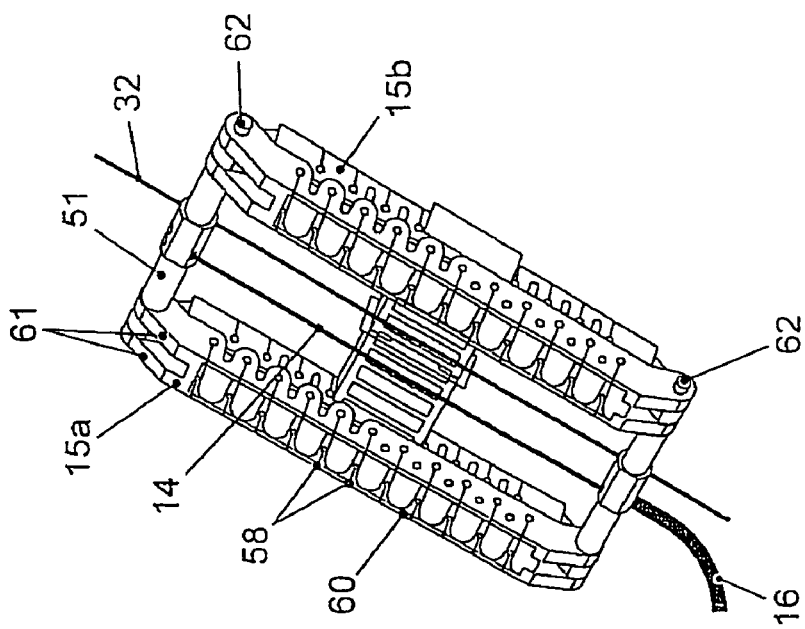
FIG. 6 shows the adjustment device of FIG. 5 in the rest position.

As can be seen in FIGS. 5 and 6, the adjustment elements are in the form of an undulating strip 55. This strip is bordered on each of its lateral edges by a rail 56 and a rail 57. This rail may have incisions 58 in one edge of the rail 56 and recesses 59 in the other edge of the rail. The recesses are formed on the inner side of the curvature of the rail so that, upon actuation of the Bowden cable core 14, the adjustment element can be curved. On the outer side the incisions 58 are provided to make possible the curvature of the adjustment element 15 and the movement of the individual adjustment members 60 relative to one another.

As can be seen in FIG. 5, a plurality of adjustment members 60 are movable relative to one another in a lower section of the adjustment element 15a because the recesses 59 are provided. As a result, this section of the adjustment element 15a is curved more sharply than the upper section of the adjustment element 15a, in the inner side of which the recesses 59 are not provided, so that movement of the individual adjustment members 60 relative to one another is not possible in the upper section. It is clear from a comparison with FIG. 4 that the lower section corresponds to section C while the upper section corresponds to section D.

In the case of the adjustment element 15b this is reversed in the embodiment illustrated, there being fewer recesses 59 in a lower portion than in an upper portion of a lower section of the adjustment element 15b, so that the lower portion is curved less sharply than the upper portion of the adjustment element 15b. It can be seen from a comparison with FIG. 4 that the lower portion corresponds to section B and the upper portion corresponds to section A.

In summary, it can be stated that through the configuration of the rail, in particular through the selection of the incisions and recesses, the behavior of the adjustment elements with regard to curvature can be defined. With the selection of adjustment elements 15a and 15b shown in FIG. 5 it has been achieved that the apex of curvature has been situated relatively far down. With a different arrangement of incisions and recesses 58 and 59 the behavior of the adjustment elements 15 regarding curvature is correspondingly changed.

FIG. 6 shows the two adjustment elements 15a and 15b when the core 14 of the Bowden cable is not tensioned. In this embodiment the two adjustment elements 15a, 15b are disposed substantially parallel one upon the other.

In FIGS. 7a and 7b the rear adjustment element 15b is represented. FIG. 7a shows the shape of the adjustment element when the Bowden cable has been actuated with the core 14; in FIG. 7b the adjustment element 15b is shown in the non-curved state. As is also shown in FIGS. 8a and 8b, the adjustment element includes an undulating strip 55 which is bordered by the rails 56, 57. The recesses 59 are arranged on the inner side of the curvature and incisions 58 are provided on the other edge to permit displacement of individual adjustment members 60 relative to one another. The recesses 59 on the inner side of the curvature are necessary so that the individual adjustment members can move with respect to one another in case of curvature. In a middle section of the adjustment element 15b no incisions 58 and recesses 59 are provided so that the adjustment members in that section cannot move relative to one another. This middle section is used for fixing to the guide plate 50, as shown in FIG. 5, and thus for fixing to the frame 12. Mounted at each end of the adjustment element 15b is a finger 70 with an aperture 71 through which the shaft 52 is pushed. The finger 70 of the adjustment element 15b is placed between the two legs 61 of the adjustment element 15a (FIG. 6), the two adjustment elements 15a, 15b then being arranged movably about the spindle 62.

In FIGS. 9 and 10 the lumbar support is shown in a perspective view, the support basket being shown supporting the lower lumbar region in FIG. 9 while the support basket 10 rests against the frame 12 in FIG. 10.

The upper end of the support basket is pivoted to a transverse strut 90 of the frame. The support basket has comb-like fingers 91 which are connected together by a connecting rail 92. In the longitudinal direction of the frame 12 the support basket 10 has on its rear side channels 93 so dimensioned that the front adjustment element 15a can slide along a channel 93 when the height of the adjustment device 11 is adjusted by a Bowden cable 94. The Bowden cable 94 includes an actuator 95 with which the height of the adjustment device 11 can be changed. The Bowden cable 94, its actuation with the actuator and its fixing to the frame 12 correspond to the prior art, so that these elements need not be described further here.

For reasons of clarity, the Bowden cable for changing the curvature of the adjustment device 11 is not shown.

The support basket 10 has on the rear side of its fingers reinforcing ribs 96 to reinforce said fingers 91. The two last fingers at the bottom of the support basket 10 are joined together.

By virtue of the fact that the support basket is not fixed to the frame at its lower end it can better support the lower back of the person sitting on the seat in the lower area. In addition, in selecting the material of the support basket it is unnecessary to ensure that said basket is sharply curved, as is usual in the prior art, when the lower end is fixed to the frame 12. The side of the support basket facing towards the frame can also be made of a material such that the adjustment device can be moved easily in the channels 93.

To sum up, the present invention makes possible a lumbar support in which the curvature can be distributed non-uniformly and in which the support basket can well guide the lower region of the spinal column.

What is claimed is:

1. A lumbar support for a seat backrest, comprising:
a support basket;
an adjustment device which adjusts a curvature of the support basket; and
a pulling element, wherein the adjustment device comprises at least one adjustment element having ends being guided in guides and being coupled to the pulling element such that, upon actuation of the pulling element, the ends of the at least one adjustment element move towards one another so as to convexly curve the at least one adjustment element, so that the at least one convexly curved adjustment element presses against a backside of the support basket to adjust the curvature of the support basket, and wherein the adjustment device has a plurality of adjustment members some of which are movable with respect to one another, and wherein the adjustment device has at least one adjustment element which includes the plurality of adjustment members.

2. A lumbar support according to claim 1, wherein the at least one adjustment element which includes the plurality of adjustment members further includes ends connected to the pulling element, actuation of which changes the positions of at least some of the adjustment members with respect to one another.

3. A lumbar support according to claim 1, wherein the pulling element is a Bowden cable having a core, the core further having a sleeve, the core of the Bowden cable being attached to one end of the at least one adjustment element and the sleeve for the core being attached to the other end of the at least one adjustment element.

4. A lumbar support according to claim 3, wherein the at least one adjustment element includes at least two adjustment elements, each of which has a first and second end, wherein the first ends of the at least two adjustment elements are connected to the core of the Bowden cable and the second ends of the at least two adjustment elements are connected to the sleeve of the Bowden cable.

5. A lumbar support according to claim 4, further including a frame to which the support basket is mounted, wherein one of the at least two adjustment elements is mounted to the frame in such a way that the first and second ends of the one of the at least two adjustment elements are arranged movably relative to the frame.

6. A lumbar support according to claim 5, wherein the adjustment device is arranged displaceably in the longitudinal direction of the seat backrest.

7. A lumbar support according to claim 3, wherein, viewed from a free end of the seat backrest, an upper free end of the at least one adjustment element is connected to the core of the Bowden cable and an other free end of the at least one adjustment element is connected to the sleeve of the Bowden cable.

8. A lumbar support according to claim 1, further including a frame to which the support basket is mounted, the support basket including a first and second end, and wherein the support basket is pivoted at the first end to the frame, the second end swivelling freely away from the frame upon actuation of the adjustment device.

9. A lumbar support according to claim 1, wherein the adjustment device includes two adjustment elements, each of which has a plurality of adjustment members and a first and second end, the two adjustment elements being connected together at their first ends.

10. A lumbar support according to claim 1, wherein some adjacent adjustment members of the at least one adjustment element are arranged rigidly with respect to one another while other adjacent adjustment members of the at least one adjustment element are arranged movably with respect to one another.

11. A lumbar support according to claim 1, further including a frame to which the support basket is mounted, wherein the at least one adjustment element is disposed substantially parallel to the frame when the adjustment device is in a first rest position in which the support basket is disposed substantially parallel to the frame.

12. A lumbar support according to claim 1, wherein the at least one adjustment element includes an undulating strip with one or more lateral edges, the undulating strip bordered at each lateral edge by a rail.

13. A lumbar support for a seat backrest, comprising:
a support basket;
an adjustment device which adjusts a curvature of the support basket;
a pulling element, wherein the adjustment device comprises at least one adjustment element having ends being guided in guides and being coupled to the pulling element such that, upon actuation of the pulling element, the ends of the at least one adjustment element move towards one another so as to convexly curve the at least one adjustment element, so that the at least one convexly curved adjustment element presses against a backside of the support basket to adjust the curvature of the support basket; and
a frame to which the support basket is mounted, the support basket including a first and second end, and wherein the support basket is pivoted at the first end to the frame, the second end swivelling freely away from the frame upon actuation of the adjustment device.

14. A lumbar support for a seat backrest, comprising:
a support basket;
an adjustment device which adjusts a curvature of the support basket; and
a pulling element, wherein the adjustment device comprises at least one adjustment element having ends being guided in guides and being coupled to the pulling element such that, upon actuation of the pulling element, the ends of the at least one adjustment element move towards one another so as to convexly curve the at least one adjustment element, so that the at least one convexly curved adjustment element presses against a backside of the support basket to adjust the curvature of the support basket, and wherein the adjustment device includes two adjustment elements, each of which has a plurality of adjustment members and a first and second end, the two adjustment elements being connected together at their first ends.

15. A lumbar support according to claim 14, wherein upon actuation of the pulling element one adjustment element is curved convexly and the other is curved concavely.

16. A lumbar support according to claim 15, further including a frame to which the support basket is mounted, wherein one of the two adjustment elements is mounted to the frame, and wherein upon actuation of the pulling element the adjustment element mounted to the frame is curved concavely while the other adjustment element is curved convexly.

17. A lumbar support according to claim 14, further including a frame to which the support basket is mounted, wherein one of the two adjustment elements is fixed to the frame, and wherein the adjustment element which is not fixed to the frame is so configured that, viewed from a free end of the seat backrest, more adjustment members are not movable with respect to one another in an upper section of the adjustment element than in a lower section of the adjustment element.

18. A lumbar support according to claim 17, wherein the two adjustment elements each include an undulating strip with one or more lateral edges, the undulating strip bordered at each lateral edge by a rail, wherein the rail includes incisions and/or recesses which ensure the movability of the two adjustment members with respect to one another.

19. A lumbar support according to claim 18, wherein the rail includes a first edge and a second edge, and wherein the incisions are formed on the first edge of the rail and the recesses on the second edge of the rail.

20. A lumbar support according to claim 14, further including a frame to which the support basket is mounted, wherein one of the two adjustment elements is fixed to the frame, and wherein the adjustment element which is fixed to the frame is so configured that, viewed from a free end of the seat backrest, more adjustment members are movable with respect to one another in an upper section of the adjustment element than in a lower section of the adjustment element.

* * * * *